US012807785B2

(12) United States Patent
Kawasaki et al.

(10) Patent No.: US 12,807,785 B2
(45) Date of Patent: Nov. 24, 2026

(54) CURABLE COMPOSITION, CURED OBJECT, FIBER-REINFORCED COMPOSITE MATERIAL, AND MOLDED FIBER-REINFORCED RESIN ARTICLE

(71) Applicant: DIC Corporation, Tokyo (JP)

(72) Inventors: Akito Kawasaki, Ichihara (JP); Makoto Kimura, Ichihara (JP); Kunihiro Morinaga, Ichihara (JP)

(73) Assignee: DIC Corporation, Tokyo (JP)

( * ) Notice: Subject to any disclaimer, the term of this patent is extended or adjusted under 35 U.S.C. 154(b) by 568 days.

(21) Appl. No.: 18/280,694

(22) PCT Filed: Mar. 17, 2022

(86) PCT No.: PCT/JP2022/012141
§ 371 (c)(1),
(2) Date: Sep. 7, 2023

(87) PCT Pub. No.: WO2022/239471
PCT Pub. Date: Nov. 17, 2022

(65) Prior Publication Data

US 2024/0301168 A1 Sep. 12, 2024

(30) Foreign Application Priority Data

May 13, 2021 (JP) ................................ 2021-081825

(51) Int. Cl.
*C08K 5/17* (2006.01)
*C08J 5/04* (2006.01)
*C08K 5/3445* (2006.01)

(52) U.S. Cl.
CPC .................................... *C08K 5/17* (2013.01); *C08J 5/04* (2013.01); *C08K 5/3445* (2013.01); *C08J 2463/02* (2013.01)

(58) Field of Classification Search
None
See application file for complete search history.

(56) References Cited

U.S. PATENT DOCUMENTS

2002/0016411 A1* 2/2002 Ando ...................... C08L 63/00
525/100

FOREIGN PATENT DOCUMENTS

| | | | |
|---|---|---|---|
| JP | 2006-143759 | A | 6/2006 |
| JP | 2014-227473 | A | 12/2014 |
| JP | 2019-176146 | A | 10/2019 |
| WO | 2019/065663 | A1 | 4/2019 |

* cited by examiner

*Primary Examiner* — Jeffrey D Washville
(74) *Attorney, Agent, or Firm* — Troutman Pepper Locke LLP

(57) ABSTRACT

Provided is a curable composition containing an epoxy resin (A), an aliphatic amine compound and/or an alicyclic amine compound (B), core-shell particles (C), and an imidazole compound (D), wherein a ratio H/E of an amount by mole H of active hydrogen in the aliphatic amine compound and/or the alicyclic amine compound (B) to an amount by mole E of epoxy group in the epoxy resin (A) is 0.3 to 0.9. The curable composition has rapid curing properties, and forms a cured object having favorable heat resistance and toughness. Therefore, the curable composition can be suitably used for a fiber-reinforced composite material and a molded fiber-reinforced resin article, in addition to an application in which the curable composition is cured.

20 Claims, No Drawings

CURABLE COMPOSITION, CURED OBJECT, FIBER-REINFORCED COMPOSITE MATERIAL, AND MOLDED FIBER-REINFORCED RESIN ARTICLE

TECHNICAL FIELD

The present invention relates to a curable composition that has rapid curing properties and forms a cured object having favorable heat resistance and toughness, a cured object thereof, a fiber-reinforced composite material, and a molded fiber-reinforced resin article.

BACKGROUND ART

Fiber-reinforced composite materials formed from carbon fibers, aramid fibers, or the like, as reinforcement fibers are widely adopted for general industrial applications of automobiles, windmills, and the like, aerospace industrial applications, and sport applications due to high specific strength and specific modulus. In recent years, the fiber-reinforced composite materials have been increasingly developed for lightweight materials substituting metals.

As a matrix resin for a fiber-reinforced composite material, a thermosetting resin such as an unsaturated polyester resin, a vinyl ester resin, or an epoxy resin is mainly used. In particular, a cured object obtained from a curable composition containing an epoxy resin has excellent heat resistance, high strength, high modulus of elasticity, adherence, and chemical resistance, and favorable moldability, and therefore practical applications of the cured object as a fiber-reinforced composite material proceed for various applications.

As a method for producing a fiber-reinforced composite material, an autoclave method, a filament winding method, a pultrusion method, a resin transfer molding (RTM) method, a press molding method, or the like is appropriately selected. Among the methods, a RTM method using a liquid resin is actively put to practical use for industrial applications of automobile, aircrafts, and the like.

Since an epoxy resin composition containing an aromatic amine-based curing component used especially in the aircraft field is more excellent in heat resistance and the like of a cured object to be obtained, use of an epoxy resin composition in which an epoxy resin, a specific aromatic diamine, a monocyclic polyhydric phenol compound, and an alcohol compound having a main chain having 2 to 6 carbon atoms and two or more hydroxy groups are blended at a specific ratio has been proposed (for example, see PTL 1). However, a higher requirement, especially a requirement of achieving a balance between rapid curing properties, and heat resistance and resilience (high toughness) of the cured object is not sufficiently satisfied, and a further improvement is required.

CITATION LIST

Patent Literature

PTL 1: Japanese Unexamined Patent Application No. 2014-227473

SUMMARY OF INVENTION

Technical Problem

An object of the present invention is to provide a curable composition that has rapid curing properties and forms a cured object having favorable heat resistance and toughness, a cured object thereof, a fiber-reinforced composite material, and a molded fiber-reinforced resin article.

Solution to Problem

The present inventors have intensively investigated to achieve the object, and as a result, found that by a curable composition containing an epoxy resin in which as a curing agent, a specific amine compound and a specific imidazole compound are used in combination, core-shell particles are blended, and an epoxy group in the epoxy resin and active hydrogen in the specific amine compound are blended at a specific ratio (molar ratio), the object can be achieved. Thus, the present invention has been completed.

That is, the present invention relates to a curable composition containing an epoxy resin (A), an aliphatic amine compound and/or an alicyclic amine compound (B), core-shell particles (C), and an imidazole compound (D), wherein a ratio H/E of an amount by mole H of active hydrogen in the aliphatic amine compound and/or the alicyclic amine compound (B) to an amount by mole E of epoxy group in the epoxy resin (A) is 0.3 to 0.9.

In the curable composition of the present invention, the epoxy resin (A) preferably contains a bisphenol F type epoxy resin.

In the curable composition of the present invention, a mixture of the epoxy resin (A) and the core-shell particles (C) preferably has a viscosity at 25° C. of 1,000 to 100,000 mPa·s.

In the curable composition of the present invention, the aliphatic amine compound and/or the alicyclic amine compound (B) is preferably at least one selected from the group consisting of triethylenetetramine, 1,3-bis(aminomethyl)cyclohexane, and isophoronediamine.

The curable composition of the present invention contains the core-shell particles (C) preferably in an amount of 1 to 10 parts by mass relative to 100 parts by mass of the total amount of the curable composition.

In the curable composition of the present invention, the core-shell particles (C) preferably have a volume average particle diameter of 50 to 1,000 nm.

The curable composition of the present invention contains the imidazole compound (D) preferably in an amount of 0.2 to 4 parts by mass relative to 100 parts by mass of the epoxy resin (A).

In the curable composition of the present invention, the imidazole compound (D) is preferably at least one selected from the group consisting of imidazole, 1-methylimidazole, 2-methylimidazole, 1,2-dimethylimidazole, and 2-ethyl-4-methylimidazole.

In the curable composition of the present invention, the epoxy resin (A) preferably contains a naphthalene type epoxy resin and/or a biphenyl type epoxy resin.

The present invention relates to a cured object of the curable composition.

The present invention relates to a fiber-reinforced composite material including the curable composition and reinforcement fibers.

The present invention relates to a molded fiber-reinforced resin article including the cured object and reinforcement fibers.

Advantageous Effects of Invention

The present invention can provide a curable composition that has rapid curing properties and forms a cured object having excellent heat resistance and resilience, a cured object thereof, a fiber-reinforced composite material, and a molded fiber-reinforced resin article.

DESCRIPTION OF EMBODIMENTS

The present invention relates to a curable composition containing an epoxy resin (A), an aliphatic amine compound and/or an alicyclic amine compound (B), core-shell particles (C), and an imidazole compound (D), wherein a ratio H/E of an amount by mole H of active hydrogen in the aliphatic amine compound and/or the alicyclic amine compound (B) to an amount by mole E of epoxy group in the epoxy resin (A) is 0.3 to 0.9.

[Epoxy Resin (A)]

The epoxy resin (A) used in the present invention can be used without particular limitation as long as it is an epoxy resin having two or more epoxy groups in the molecule. Examples of the epoxy resin (A) include bisphenol type epoxy resins such as a bisphenol A type epoxy resin, a bisphenol S type epoxy resin, and a bisphenol F type epoxy resin; a biphenyl type epoxy resin; a naphthalene type epoxy resin; a triphenylmethane type epoxy resin; a glycidyl amine type epoxy resin; novolac type epoxy resins such as a phenol novolac type epoxy resin, a cresol novolac type epoxy resin, and a bisphenol type novolac; various epoxidized dicyclopentadiene-modified phenol resins obtained by a reaction of dicyclopentadiene with various phenols; an epoxy resin having a fluorene skeleton; a phosphorus-containing epoxy resin synthesized from 10-(2,5-dihydroxyphenyl)-10H-9-oxa-10-phosphaphenanthrene-10-oxide, and the like; aliphatic epoxy resins such as neopentyl glycol diglycidyl ether and 1,6-hexanediol diglycidyl ether; alicyclic epoxy resins such as 3,4-epoxycyclohexylmethyl-3,4-epoxycyclohexanecarboxylate, and bis(3,4-epoxycyclohexyl) adipate; and heterocycle-containing epoxy resins such as triglycidyl isocyanurate. Among these, at least one epoxy resin selected from the group consisting of a bisphenol A type epoxy resin, a bisphenol S type epoxy resin, a bisphenol F type epoxy resin, a biphenyl type epoxy resin, and a naphthalene type epoxy resin is preferred since a curable composition forming a cured object having excellent mechanical strength is obtained. From the viewpoint of low viscosity and resilience, it is more preferable that a bisphenol F type epoxy resin be contained. From the viewpoint of resilience, it is further preferable that a biphenyl type epoxy resin and/or a naphthalene type epoxy resin be contained, in addition to the bisphenol F type epoxy resin.

From the viewpoint of low viscosity and resilience, it is preferable that the epoxy resin (A) contain the bisphenol F type epoxy resin. Examples of the bisphenol F type epoxy resin include trade name "EPICLON 830-S" (manufactured by DIC Corporation, epoxy equivalent: 165 to 180 g/eq, viscosity (25° C.): 3,000 to 4,500 mPa·s), trade name "JER 807" (manufactured by Mitsubishi Chemical Corporation, epoxy equivalent: 160 to 175 g/eq), and trade name "YDF-170" (manufactured by NIPPON STEEL Chemical & Material CO., LTD., epoxy equivalent: 160 to 180 g/eq).

From the viewpoint of resilience, it is preferable that the epoxy resin (A) contain the naphthalene type epoxy resin. Examples of the naphthalene type epoxy resin include trade name "EPICLON HP-4032D" (manufactured by DIC Corporation, epoxy equivalent: 136 to 150 g/eq, viscosity (50° C.): 250 to 850 mPa·s), trade name "EPICLON HP-4700" (manufactured by DIC Corporation, epoxy equivalent: 155 to 170 g/eq), trade name "EPICLON HP-4710" (manufactured by DIC Corporation, epoxy equivalent: 160 to 180 g/eq), and trade name "EPICLON HP-4770" (manufactured by DIC Corporation, epoxy equivalent: 195 to 210 g/eq).

From the viewpoint of resilience, it is preferable that the epoxy resin (A) contain the biphenyl type epoxy resin. Examples of the biphenyl type epoxy resin include trade name "XY4000" (manufactured by Mitsubishi Chemical Corporation, epoxy equivalent: 180 to 192 g/eq), and trade name "NC-3000" (manufactured by Nippon Kayaku Co., Ltd., epoxy equivalent: 265 to 285 g/eq).

From the viewpoint of curing properties of the curable composition, the epoxy equivalent of the epoxy resin (A) is preferably 160 to 200 g/eq, more preferably 160 to 195 g/eq, and further preferably 160 to 190 g/eq.

The viscosity at 25° C. of the mixture of the epoxy resin (A) and the core-shell particles (C) is preferably 1,000 to 100,000 mPa·s, more preferably 1,000 to 50,000 mPa·s, and further preferably 1,000 to 15,000 mPa·s. The viscosity falling within the above-described range is preferred from the viewpoint of flowability of the curable composition and impregnating properties of reinforcement fibers or the like with the curable composition.

[Amine Compound (B)]

The aliphatic amine compound and/or the alicyclic amine compound (B) (hereinafter sometimes referred to as "amine compound (B)") is used as a curing agent for the epoxy resin (A). The aliphatic amine compound and the alicyclic amine compound in the present invention are a compound in which a carbon atom to be bonded to an amino group is not aromatic, and may be a compound having an aromatic ring in the structure.

The aliphatic amine compound and/or the alicyclic amine compound (B) is an amine having one or more active hydrogens in the molecule. From the viewpoint of rapid curing properties, an aliphatic or alicyclic amine is used. In particular, from the viewpoint of heat resistance of the cured object, a polyamine having two or more active hydrogens in the molecule is preferred.

Examples of the aliphatic amine compound include alkylenediamines such as ethylenediamine, 1,2-diaminopropane, 1,3-diaminopropane, 1,3-diaminobutane, and 1,4-diaminobutane; polyalkylpolyamines such as diethylenetriamine, triethylenetetramine, and tetraethylenepentamine; N,N-dimethylaminopropylamine, N,N-diethylaminopropylamine, N,N-diisopropylaminopropylamine, N,N-diallylaminopropylamine, N,N-bisaminopropylallylamine, bis[3-(N,N-dimethylaminopropyl)]amine, bis[3-(N,N-diethylaminopropyl)]amine, bis[3-(N,N-diisopropylaminopropyl)]amine, bis[3-(N,N-dibutylaminopropyl)]amine, N,N-dimethylaminoethylamine, N,N-diethylaminoethylamine, N,N-diisopropylaminoethylamine, N,N-diallylaminoethylamine, N,N-(bisaminopropyl)-N-methylamine, N,N-bisaminopropylethylamine, N,N-bisaminopropylpropylamine, N,N-bisaminopropylbutylamine, N,N-bisaminopropylpentylamine, N,N-bisaminopropylhexylamine, N,N-bisaminopropyl-2-ethylhexylamine, N,N,N'-trimethylethylenediamine, N'-ethyl-N,N-dimethylethylenediamine, N'-ethyl-N,N-dimethylpropanediamine; N,N-benzylmethylaminoethylamine, N,N-dibenzylaminoethylamine, N,N-benzylmethylaminopropylamine, N,N-dibenzylaminopropylamine, 4-(N,N-dimethylamino)benzylamine, 4-(N,N-diethylamino)benzylamine, 4-(N,N-diisopropylamino)benzylamine, N'-ethyl-N,N-dibenzylaminopropylamine, and N,N-bisaminopropylbenzylamine. The aliphatic amine compound may be used alone, or two or more types thereof may be used in combination.

Among these, from the viewpoints of the viscosity and rapid curing properties of a composition when the epoxy resin (A) is combined, and the mechanical strength of the cured object obtained, diethylenetriamine, triethylenetetramine, or tetraethylenepentamine is preferably used, and triethylenetetramine is particularly preferably used.

Examples of the alicyclic amine compound include N,N-dimethylbisaminocyclohexane, 1,3-bis(aminomethyl)cyclohexane, 1,4-bis(aminomethyl)cyclohexane, 1,2-diaminocyclohexane, 1,4-diamino-3,6-diethylcyclohexane, N,N-cyclohexylmethylaminoethylamine, N,N-dicyclohexylaminoethylamine, N,N-cyclohexylmethylaminopropylamine, N,N-dicyclohexylaminopropylamine, N, N-bisaminopropylcyclohexylamine, isophoronediamine, and N,N,-dimethylisophoronediamine. The alicyclic amine compound may be used alone, or two or more types thereof may be used in combination.

Among these, from the viewpoints of the viscosity and rapid curing properties of the composition when the epoxy resin (A) is combined, and the mechanical strength of the cured object obtained, the amine compound (B) is preferably at least one selected from the group consisting of triethylenetetramine, 1,3-bis(aminomethyl)cyclohexane, and isophoronediamine, and more preferably 1,3-bis(aminomethyl) cyclohexane.

As the amine compound (B), a polyepoxy-addition-modified product produced by a reaction of the amine compound (B) with an epoxy resin including a glycidyl ether such as phenyl glycidyl ether, butyl glycidyl ether, bisphenol A-diglycidyl ether, or bisphenol F-diglycidyl ether, or a glycidyl ester of carboxylic acid; an amidation-modified product produced by a reaction of the organic polyamine with a carboxylic acid such as phthalic acid, isophthalic acid, or dimer acid; a Mannich-modified product produced by a reaction of the polyamine with an aldehyde such as formaldehyde; a Mannich-modified product produced by a reaction of a phenol having at least one reactive moiety capable of being aldehydated in a nucleus, such as phenol, cresol, xylenol, tert-butylphenol, or resorcin, with the amine compound; or the like can be used.

In the curable composition of the present invention, the blending ratio of the epoxy resin (A) to the amine compound (B) is characterized in that the ratio H/E of the amount by mole H of active hydrogen in the aliphatic amine compound and/or the alicyclic amine compound (B) to the amount by mole E of epoxy group in the epoxy resin (A) is 0.3 to 0.9. The ratio H/E falling within the above-described range is suitable. This is because, due to an excessive amount of epoxy group from the epoxy resin (A), two types of curing reactions including an addition reaction of the epoxy group with an amino group from the amine compound (B) and an anionic polymerization reaction of an imidazole group from the imidazole compound (D) described below proceed in parallel, the rapid curing properties of the curable composition is improved, the aromatic ring concentration of the cured object obtained is increased, and the high heat resistance effect of the cured object tends to be developed. A ratio H/E of more than 0.9 is not preferred. This is because the rapid curing properties are exerted due to the imidazole compound (D), but heat resistance is decreased. A ratio H/E of 0.3 to 0.8 is particularly preferred.

[Core-Shell Particles (C)]

The core-shell particles (C) specifically represent core-shell type rubber particles, which refer to rubber particles in which on a surface of a particle core component containing as a main component a crosslinked rubber polymer, a polymer different from the core component is graft-polymerized to cover a part or the whole of the particle core component surface with a shell component.

Examples of the core component include crosslinked rubber particles. The type of rubber of the crosslinked rubber particles is not limited, and examples thereof include a butadiene rubber, an acrylic rubber, a silicone rubber, a butyl rubber, a nitrile rubber, a styrene rubber, a synthetic natural rubber, and an ethylene-propylene rubber.

Examples of the shell component include polymers obtained by polymerization of one or more monomers selected from the group consisting of an acrylic acid ester, a methacrylic acid ester, and an aromatic vinyl compound. It is preferable that the shell component be graft-polymerized on the core component and the shell component be chemically bonded to the polymer constituting the core component. When as the core component, a crosslinked rubber polymer including a polymer of styrene and butadiene is used, it is preferable that as the shell component, a polymer of methyl methacrylate as the methacrylic acid ester and styrene as the aromatic vinyl compound be used.

Examples of commercially available product of the core-shell type rubber particles include "PARALOID (registered trademark)" EXL-2655 (manufactured by Kureha Chemical Industry Co.) made of a butadiene-alkyl methacrylate-styrene copolymer, "STAPHYLOID (registered trademark)" AC-3355 and TR-2122 (manufactured by Takeda Pharmaceutical Company Limited) made of an acrylate-methacrylate copolymer, and "PARALOID (registered trademark)" EXL-2611 and EXL-3387 (manufactured by Rohm and Haas Company) and "KANE ACE (registered trademark)" MX series (manufactured by KANEKA CORPORATION) made of a butyl acrylate-methyl methacrylate copolymer.

The volume average particle diameter of the core-shell particles (C) is preferably 50 to 1,000 nm, and more preferably 50 to 500 nm since an epoxy resin composition having favorable impregnating properties of fibers at low viscosity and capable of forming a cured object having excellent heat resistance and mechanical properties is obtained.

The curable composition of the present invention contains the core-shell particles (C) in an amount of preferably 1 to 10 parts by mass, more preferably 2 to 9 parts by mass, and further preferably 3 to 8 parts by mass, relative to 100 parts by mass of the total amount of the curable composition. Use of the core-shell particles (C) in an amount within the above-described range is useful. This is because a curable composition having favorable impregnating properties of fibers at low viscosity is obtained, and a curable composition capable of forming a cured object having excellent heat resistance and mechanical properties (toughness, etc.) is obtained.

With the core-shell particles (C), the epoxy resin (A) contains the bisphenol F type epoxy resin. Use of the core-shell particles (C), the epoxy resin (A), and the bisphenol F type epoxy resin is useful since a highly tough cured object is obtained. Combination of a prescription (using the epoxy resin (A) and the amine compound (B)) for achieving high heat resistance is useful since a curable composition forming a cured object having high toughness and high heat resistance is obtained.

[Imidazole Compound (D)]

The imidazole compound (D) used in the present invention is used as a curing agent for the epoxy resin (A). Examples of the imidazole compound (D) include, but not particularly limited to, imidazole, 1-methylimidazole, 2-methylimidazole, 1,2-dimethylimidazole, 2-ethyl-4-methylimidazole, 2-isopropylimidazole, 2-undecylimidazole, 2-heptadecylimidazole, 2-phenylimidazole, 2-phenyl-4-methylimidazole, and 2-aminopropylimidazole. The imidazole compound may be used alone, or two or more types thereof may be used in combination. Among these, from the viewpoint of achieving more excellent balance between the rapid curing properties of the curable composition and the heat resistance of the cured object, at least one selected from the group consisting of imidazole, 1-methylimidazole, 2-methylimidazole, 1,2-dimethylimidazole, and 2-ethyl-4-methylimidazole is preferably used.

The curable composition of the present invention contains the imidazole compound (D) preferably in an amount of 0.2 to 4 parts by mass, more preferably 0.3 to 3 parts by mass, and further preferably 0.4 to 2 parts by mass, relative to 100 parts by mass of the epoxy resin (A). Use of the imidazole compound (D) in an amount within the above-described range is useful since a curable composition capable of expressing rapid curing properties is obtained.

[Other Component]

The curable composition of the present invention is characterized in that the epoxy resin (A) and the aliphatic amine compound and/or the alicyclic amine compound (B) are used at a specific ratio, and the core-shell particles (C) and the imidazole compound (D) are contained. In addition, the curable composition may contain another component. Examples of the other component include acid-modified polybutadiene, a polyether sulfone resin, a polycarbonate resin, a polyphenylene ether resin, and an acrylic resin.

The acid-modified polybutadiene is a component having a reactivity with the epoxy resin (A). When the acid-modified polybutadiene is used in combination, the cured object obtained can express excellent mechanical strength, heat resistance, and resistance to humidity and heat.

Examples of the acid-modified polybutadiene include a butadiene having as a butadiene skeleton a skeleton derived from 1,3-butadiene or 2-methyl-1,3-butadiene. Examples of the skeleton derived from 1,3-butadiene include a skeleton having any of a 1,2-vinyl structure, a 1,4-trans structure, and a 1,4-cis structure, and a skeleton having two or more of the structures. Examples of the skeleton derived from 2-methyl-1,3-butadiene include a skeleton having any of a 1,2-vinyl structure, a 3,4-trans structure, a 1,4-cis structure, and a 1,4-trans structure, and a skeleton having two or more of the structures.

Examples of an acid-modified component of the acid-modified polybutadiene include, but not particularly limited to, an unsaturated carboxylic acid. The unsaturated carboxylic acid is preferably acrylic acid, methacrylic acid, maleic acid, maleic anhydride, itaconic acid, or itaconic anhydride. From the viewpoint of reactivity, itaconic anhydride and maleic anhydride are preferred, and maleic anhydride is further preferred.

From the viewpoint of reactivity with the epoxy resin (A), the acid value of the acid-modified polybutadiene that includes an acid-modified polybutadiene derived from 1,3-butadiene is preferably 5 to 400 mgKOH/g, more preferably 20 to 300 mgKOH/g, and further preferably 50 to 200 mgKOH/g. The form of unsaturated carboxylic acid moiety is not limited as long as the unsaturated carboxylic acid moiety is copolymerized in the acid-modified polybutadiene. Examples thereof include random copolymerization, block copolymerization, and graft copolymerization (graft modification). The weight average molecular weight (Mw) of the acid-modified polybutadiene is preferably 1,000 to 100,000.

The acid-modified polybutadiene is obtained by modifying polybutadiene with an unsaturated carboxylic acid, but a commercially available product may be used as it is. As the commercially available product, for example, maleic anhydride-modified liquid polybutadiene (polyvest MA75, Polyvest EP MA120, etc.) manufactured by Evonik Degussa GmbH, maleic anhydride-modified polyisoprene (LIR-403, LIR-410) manufactured by KURARAY CO., LTD., or the like can be used.

The content of the acid-modified polybutadiene in the curable composition is preferably 1 to 40 parts by mass, and more preferably 3 to 30 parts by mass, relative to 100 parts by mass of the total mass of a resin component of the curable composition since the cured object obtained has favorable elongation, heat resistance, and resistance to humidity and heat.

The polyethersulfone resin is a thermoplastic resin, and is not contained in a crosslinking network in a curing reaction of the curable composition. However, the cured object obtained can express more excellent mechanical strength and heat resistance due to an excellent effect of a modifier having high Tg.

The content of the polyethersulfone resin in the curable composition is preferably 1 to 30 parts by mass, and more preferably 3 to 20 parts by mass, relative to 100 parts by mass of the total mass of the resin component since the cured object obtained has favorable mechanical strength and heat resistance.

Examples of the polycarbonate resin include a polycondensation product of dihydric or difunctional phenol with halogenated carbonyl, and a product obtained by polymerization of a dihydric or difunctional phenol with a diester of carbonic acid through transesterification.

Examples of the dihydric or difunctional phenol include 4,4'-dihydroxybiphenyl, bis(4-hydroxyphenyl)methane, 1,1-bis(4-hydroxyphenyl)ethane, 2,2-bis(4-hydroxyphenyl)propane, 2,2-bis(3-methyl-4-hydroxyphenyl)propane, 2,2-bis(3,5 -dimethyl-4-hydroxyphenyl)propane, 1,1-bis(4-hydroxyphenyl)cyclohexane, bis(4-hydroxyphenyl) ether, bis(4-hydroxyphenyl) sulfide, bis(4-hydroxyphenyl) sulfone, bis(4-hydroxyphenyl) sulfoxide, bis(4-hydroxyphenyl) ketone, hydroquinone, resorcin, and catechol. Among the dihydric or difunctional phenols, bis(hydroxyphenyl) alkanes are preferred, and a product including as a raw material 2,2-bis(4-hydroxyphenyl)propane is particularly preferred.

Examples of the halogenated carbonyl or the diester of carbonic acid to be reacted with the dihydric or difunctional phenol include phosgene; diaryl carbonates such as dihaloformate of dihydric phenol, diphenyl carbonate, ditolyl carbonate, bis(chlorophenyl) carbonate, and m-cresyl carbonate; and aliphatic carbonate compounds such as dimethyl carbonate, diethyl carbonate, diisopropyl carbonate, dibutyl carbonate, diamyl carbonate, and dioctyl carbonate.

The polycarbonate resin may have a linear chain as the molecular structure of a polymer chain. The polycarbonate resin may further have a branched structure on the polymer chain. Such a branched structure can be introduced by using as a raw material 1,1,1-tris(4-hydroxyphenyl)ethane, α,α',α"-tris(4-hydroxyphenyl)-1,3,5-triisopropylbenzene, phloroglucinol, trimellitic acid, isatin bis(o-cresol), or the like.

Examples of the polyphenylene ether resin include poly(2,6-dimethyl-1,4-phenylene) ether, poly(2-methyl-6-ethyl-14-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, and poly(2-methyl-6-hydroxyethyl-1,4-phenylene) ether.

Among these, poly(2,6-dimethyl-1,4-phenylene) ether is preferred. The polyphenylene ether resin may be a polyphenylene ether having as a partial structure a 2-(dialkylaminomethyl)-6-methylphenylene ether unit, a 2-(N-alkyl-N-phenylaminomethyl)-6-methylphenylene ether unit, or the like.

As the polyphenylene ether resin, a modified polyphenylene ether resin in which a reactive functional group such as a carboxy group, an epoxy group, an amino group, a mercapto group, a silyl group, a hydroxy group, or an anhydrous dicarboxy group is introduced in a resin structure thereof by any method such as a grafting reaction or copolymerization can also be used without departing from the object of the present invention.

The acrylic resin can be added in order to improve the mechanical strength, especially the fracture toughness, of the cured object.

A constituent monomer, a polymerization process, and the like for the acrylic resin are appropriately selected depending on desired performance. Partial specific examples of the constituent monomer include alkyl esters of (meth)acrylic acid such as methyl (meth)acrylate, ethyl (meth)acrylate, butyl (meth)acrylate, and 2-ethylhexyl (meth)acrylate; (meth)acrylic acid esters having an alicyclic structure such as cyclohexyl (meth)acrylate and cyclohexyl methacrylate; (meth)acrylic acid esters having an aromatic ring such as benzyl (meth)acrylate; (fluoro)alkyl esters of (meth)acrylic acid such as 2-trifluoroethyl (meth)acrylate; acid group-containing monomers such as (meth)acrylic acid, maleic acid (anhydride), and maleic anhydride; hydroxy group-containing monomers such as hydroxyethyl (meth)acrylate, hydroxypropyl (meth)acrylate, and hydroxybutyl (meth) acrylate; epoxy group-containing monomers such as glycidyl (meth)acrylate, and 3,4-epoxycyclohexylmethyl methacrylate; aromatic vinyl compounds such as styrene; and diene compounds such as butadiene and isoprene. Among these, an acrylic resin containing as a main component an alkyl ester of (meth)acrylic acid is preferred since a curable composition forming a cured object having more excellent mechanical strength is obtained.

The acrylic resin is preferably a block copolymer in which a plurality of block copolymers of different monomer configurations are copolymerized. Examples of the block copolymer include an AB-type diblock copolymer, and an ABA-type or ABC-type triblock copolymer. In particular, it is preferable that the block copolymer have both a block containing as a main component methyl (meth)acrylate and a block containing as a main component butyl (meth) acrylate since a curable composition forming a cured object having more excellent mechanical strength is obtained. More specifically, a triblock acrylic resin of poly(methyl methacrylate) block-poly(butyl acrylate) block-poly(methyl methacrylate) block, and a diblock acrylic resin of poly(methyl methacrylate) block-poly(butyl acrylate) block are preferred, and a diblock acrylic resin is particularly preferred. The weight average molecular weight (Mw) of the acrylic resin is preferably 1,000 to 500,000.

The content of the acrylic resin in the curable composition is not particularly limited, and is appropriately adjusted according to desired performances of the cured object. In particular, since a curable composition forming a cured object having more excellent mechanical strength is obtained, the acrylic resin is contained preferably in an amount of 0.1 to 20 parts by mass, and more preferably 0.5 to 10 parts by mass, relative to 100 parts by mass of the total mass of the resin component of the curable composition.

The curable composition of the present invention may contain a flame retardant, a filling material, an additive, an organic solvent, or the like without impairing the effects of the present invention. A blending order during production of the curable composition is not particularly limited as long as it is a method that can achieve the effects of the present invention. That is, all the components may be mixed in advance and used, or may be appropriately mixed in order and used. In a blending method, for example, kneading and production can be carried out using a kneading machine such as an extruder, a heating roll, a kneader, a roller mixer, or a Banbury mixer. Hereinafter, various types of members and raw materials that can be contained in the curable composition of the present invention will be described.

[Flame Retardant]

The curable composition of the present invention may contain a halogen free flame retardant substantially containing no halogen atom to exert flame retardancy.

Examples of the halogen free flame retardant include a phosphorus-containing flame retardant, a nitrogen-containing flame retardant, a silicone-based flame retardant, an inorganic flame retardant, and an organic metal salt-based flame retardant. During use of the halogen free flame retardant, there are no limits. The halogen free flame retardant may be used alone, a plurality of halogen free flame retardants of the same type may be used, or halogen free flame retardants of different types may be used in combination.

As the phosphorus-containing flame retardant, an inorganic or organic phosphorus compound may be used. Examples of the inorganic phosphorus compound include red phosphorous, ammonium polyphosphates such as monoammonium polyphosphate, diammonium polyphosphate, triammonium polyphosphate, and ammonium polyphosphate, and inorganic nitrogen-containing phosphorus compounds such as phosphoric amide.

It is preferable that the red phosphorous be surface-treated to prevent hydrolysis and the like. Examples of a surface treatment method include (i) a method for performing a covering treatment with an inorganic compound such as magnesium hydroxide, aluminum hydroxide, zinc hydroxide, titanium hydroxide, bismuth oxide, bismuth hydroxide, bismuth nitrate, or a mixture thereof, (ii) a method for performing a covering treatment with a mixture of an inorganic compound such as magnesium hydroxide, aluminum hydroxide, zinc hydroxide, or titanium hydroxide, or a thermosetting resin such as a phenol resin, and (iii) a method for performing a two-stage covering treatment in which a coating of an inorganic compound such as magnesium hydroxide, aluminum hydroxide, zinc hydroxide, or titanium hydroxide is covered with a thermosetting resin such as a phenol resin.

Examples of the organic phosphorus compound include common organic phosphorus compounds such as a phosphoric acid ester compound, a phosphonic acid compound, a phosphinic acid compound, a phosphine oxide compound, a phosphorane compound, and an organic nitrogen-containing phosphorus compound, and cyclic organic phosphorus compounds such as 9,10-dihydro-9-oxa-10-phosphaphenanthrene=10-oxide, 10-(2,5-dihydrooxyphenyl)-10H-9-oxa-10-phosphaphenanthrene=10-oxide, and 10-(2,7-dihydrooxynaphthyl)-10H-9-oxa-10-phosphaphenanthrene=10-oxide.

When the phosphorus-containing flame retardant is used, hydrotalcite, magnesium hydroxide, a boron compound, zirconium oxide, a black dye, calcium carbonate, zeolite, zinc molybdate, activated carbon, or the like may be used in combination with the phosphorus-containing flame retardant.

Examples of the nitrogen-containing flame retardant include a triazine compound, a cyanuric acid compound, an isocyanuric acid compound, and phenothiazine. The triazine compound, the cyanuric acid compound, and the isocyanuric acid compound are preferred.

Examples of the triazine compound include melamine, acetoguanamine, benzoguanamine, melon, melam, succinoguanamine, ethylenedimelamine, melamine polyphosphate, and triguanamine, aminotriazine sulfate compounds such as guanylmelamine sulfate, melem sulfate, and melam sulfate, the aminotriazine-modified phenol resin, and the aminotriazine-modified phenol resin further modified with tung oil, isomerized linseed oil, or the like.

Specific examples of the cyanuric acid compound include cyanuric acid, and melamine cyanurate.

The amount of the nitrogen-containing flame retardant blended is appropriately selected depending on the type of the nitrogen-containing flame retardant, the other component of the curable composition, and a desired degree of flame retardancy. For example, the nitrogen-containing flame retardant is preferably blended in an amount of 0.05 to 10 parts by mass, and particularly preferably 0.1 to 5 parts by mass, relative to 100 parts by mass of the total amount of the resin component of the curable composition.

When the nitrogen-containing flame retardant is used, a metal hydroxide, a molybdenum compound, or the like may be used in combination.

As the silicone-based flame retardant, an organic compound containing a silicon atom can be used without particular limitation. Examples thereof include a silicone oil, a silicone rubber, and a silicone resin.

The amount of the silicone-based flame retardant blended is appropriately selected depending on the type of the silicone-based flame retardant, the other component of the curable composition, and a desired degree of flame retardancy. For example, the silicone-based flame retardant is preferably blended in an amount of 0.05 to 20 parts by mass relative to 100 parts by mass of the total amount of the resin component of the curable composition. When the silicone-based flame retardant is used, a molybdenum compound, alumina, or the like may be used in combination.

Examples of the inorganic flame retardant include a metal hydroxide, a metal oxide, a metal carbonate compound, a metal powder, a boron compound, and a low-melting-point glass.

Specific examples of the metal hydroxide include aluminum hydroxide, magnesium hydroxide, dolomite, hydrotalcite, calcium hydroxide, barium hydroxide, and zirconium hydroxide.

Specific examples of the metal oxide include zinc molybdate, molybdenum trioxide, zinc stannate, tin oxide, aluminum oxide, iron oxide, titanium oxide, manganese oxide, zirconium oxide, zinc oxide, molybdenum oxide, cobalt oxide, bismuth oxide, chromium oxide, nickel oxide, copper oxide, and tungsten oxide.

Specific examples of the metal carbonate compound include zinc carbonate, magnesium carbonate, calcium carbonate, barium carbonate, basic magnesium carbonate, aluminum carbonate, iron carbonate, cobalt carbonate, and titanium carbonate.

Specific examples of the metal powder include aluminum, iron, titanium, manganese, zinc, molybdenum, cobalt, bismuth, chromium, nickel, copper, tungsten, and tin.

Specific examples of the boron compound include zinc borate, zinc metaborate, barium metaborate, boric acid, and borax.

Specific examples of the low-melting-point glass include CEEPREE (Bokusui Brown Co., Ltd), hydrated glass $SiO_2$—MgO—$H_2O$, and PbO—$B_2O_3$-based, ZnO—$P_2O_5$—MgO-based, $P_2O_5$—$B_2O_3$—PbO—MgO-based, P—Sn—O—F-based, PbO—$V_2O_5$—$TeO_2$-based, $Al_2O_3$—$H_2O$-based, and lead borosilicate-based glass compounds.

The amount of the inorganic flame retardant blended is appropriately selected depending on the type of the inorganic flame retardant, the other component of the curable composition, and a desired degree of flame retardancy. For example, the nitrogen-containing flame retardant is preferably blended in an amount of 0.05 to 20 parts by mass, and particularly preferably 0.5 to 15 parts by mass, relative to 100 parts by mass of the total amount of the resin component of the curable composition.

Examples of the organic metal salt-based flame retardant include ferrocene, an acetylacetonate metal complex, an organic metal carbonyl compound, an organic cobalt salt compound, an organic sulfonic acid metal salt, and a compound in which a metal atom is ionically bonded or coordinately bonded to an aromatic compound or a heterocyclic compound.

The amount of the organic metal salt-based flame retardant blended is appropriately selected depending on the type of the organic metal salt-based flame retardant, the other component of the curable composition, and a desired degree of flame retardancy. For example, the silicone-based flame retardant is preferably blended in an amount of 0.005 to 10 parts by mass relative to 100 parts by mass of the total amount of the resin component of the curable composition.

[Filling Material]

The curable composition of the present invention may contain a filling material. When the curable composition of the present invention contains a filling material, the cured object obtained can express excellent mechanical properties.

Examples of the filling material include titanium oxide, glass beads, glass flakes, glass fibers, calcium carbonate, barium carbonate, calcium sulfate, barium sulfate, potassium titanate, aluminum borate, magnesium borate, melted silica, crystalline silica, alumina, silicon nitride, aluminum hydroxide, fibrous reinforcing agents such as kenaf fibers, carbon fibers, alumina fibers, and quartz fibers, and a non-fibrous reinforcing agent. One type of the filling material may be alone, or two or more types thereof may be used in combination. The filling material may be covered with an organic substance, an inorganic substance, or the like.

When glass fibers are used as the filling material, the glass fibers can be selected from long-fiber rovings, short-fiber chopped strands, and middle fibers for use. Glass fibers surface-treated for a resin to be used are preferably used. Blending of the filling material can further enhance the strength of noninflammable layer (or a carbonization layer) produced during combustion. The noninflammable layer (or carbonization layer) produced once during combustion is unlikely to be broken, can exert stable thermal insulation performance, and achieves a higher flame-retardant effect. To a material, high rigidity can be further imparted.

[Additive]

The curable composition of the present invention may contain an additive. When the curable composition of the present invention contains an additive, the rigidity, dimensional stability, and other characteristics of the cured object obtained are enhanced. As the additive, for example, a plasticizer, an antioxidant, an ultraviolet absorber, stabilizers such as a light stabilizer, an antistat, a conductivity-imparting agent, a stress relieving agent, a release agent, a crystallization accelerator, a hydrolysis inhibitor, a lubricant, an impact-imparting agent, a sliding modifier, a compatibilizer, a nucleating agent, a toughening agent, a reinforcing agent, a flowing adjuster, a dye, a sensitizer, a coloring pigment, a rubbery polymer, a thickener, an anti-precipitating agent, an anti-sagging agent, an anti-foaming agent, a coupling agent, an anti-rust agent, an antibacterial antifungal agent, a stain-proofing agent, a conductive polymer, or the like can be added.

[Organic Solvent]

The curable composition of the present invention may contain an organic solvent when a molded fiber-reinforced resin article is produced by a filament winding method. Examples of an organic solvent usable herein include methyl ethyl ketone acetone, dimethylformamide, methyl isobutyl ketone, methoxy propanol, cyclohexanone, methyl cellosolve, ethyl diglycol acetate, and propylene glycol monomethyl ether acetate. The organic solvent and an appropriate use amount can be appropriately selected depending on applications.

The curable composition of the present invention can be used in various applications of a coating material, an electric or electronic material, an adhesive, a molded product, and the like by using excellent features such as greatly high curing speed, and the heat resistance and mechanical strength (high toughness, etc.) of the cured object. The curable composition can be suitably used for a fiber-reinforced composite material and a molded fiber-reinforced resin article, in addition to an application in which the curable composition is cured and used. Hereinafter, they will be described.

[Cured Object]

The present invention relates to the cured object of the curable composition. The cured object obtained by using the curable composition has high heat resistance and high toughness, and is useful.

A method for obtaining the cured object may conform to a general method for curing an epoxy resin composition. For example, a heating temperature condition may be appropriately selected depending on the type, application, and the like of combined curing agent. Examples of the method include a method for heating the curable composition at a temperature range of room temperature (25° C.) to approximately 250° C. As a molding method or the like, a general method for the curable composition can be used. A specific condition peculiar to the curable composition of the present invention is not necessary.

[Fiber-Reinforced Composite Material]

The present invention relates to a fiber-reinforced composite material including the curable composition and reinforcement fibers. The fiber-reinforced composite material produced by using the curable composition has excellent impregnating properties of reinforcement fibers, and rapid curing properties, and is useful. The fiber-reinforced composite material refers to a material before curing in which reinforcement fibers are impregnated with the curable composition.

The reinforcement fibers may be any of a twisted yarn, an untwisted yarn, a non-twisted yarn, or the like. The untwisted yarn and the non-twisted yarn are preferred since they have excellent moldability in the fiber-reinforced composite material. As a form of the reinforcement fibers, fibers in which fiber directions are aligned in one direction, or a fabric can be used. The fabric can be freely selected from a plain weave, a sateen weave, and the like according to a place to be used and an application. Specific examples of the reinforcement fibers include carbon fibers, glass fibers, aramid fibers, boron fibers, alumina fibers, and silicon carbide fibers, which have excellent mechanical strength and durability. Two or more of these fibers can be used in combination. Among these, carbon fibers are preferred since a molded article has favorable strength. As the carbon fibers, any fibers such as polyacrylonitrile-based, pitch-based, or rayon-based fibers can be used.

A method for obtaining the fiber-reinforced composite material from the curable composition of the present invention is not particularly limited. Examples thereof include a method in which components constituting the curable composition are uniformly mixed to produce a varnish, and one-directional reinforcement fibers in which reinforcement fibers are aligned in one direction are immersed in the varnish (a state before curing in a pultrusion method or a filament winding method), and a method in which fabrics of reinforcement fibers are overlaid and placed in a concave mold, and sealed with a convex mold, and a resin is injected, and the fabrics are impregnated with the resin under pressure (a state before curing in a RTM method).

In the fiber-reinforced composite material of the present invention, the curable composition may be localized near the surface of fibers without necessarily impregnating the inside of bundles of fibers with the curable composition.

In the fiber-reinforced composite material of the present invention, the volume content of the reinforcement fibers is preferably 40 to 85%, and in terms of strength, further preferably 50 to 70%, relative to the whole volume of the fiber-reinforced composite material. When the volume content is less than 40%, the content of the curable composition is too high, and therefore, the flame retardancy of the cured object obtained may be insufficient, or various characteristics required for a fiber-reinforced composite material having excellent specific modulus and specific strength are not necessarily satisfied. When the volume content is more than 85%, adhesive properties between the reinforcement fibers and the resin composition may be deteriorated.

[Molded Fiber-Reinforced Resin Article]

The present invention relates to a molded fiber-reinforced resin article including the cured object and the reinforcement fibers. The molded fiber-reinforced resin article produced by using the cured object has excellent impregnating properties of the reinforcement fibers, and rapid curing properties. Furthermore, the fiber-reinforced composite material has high heat resistance and excellent mechanical strength (high toughness, etc.), and is useful. The molded fiber-reinforced resin article is a molded article including the reinforcement fibers and the cured object of the curable composition, and is obtained by thermally curing the fiber-reinforced composite material.

In the molded fiber-reinforced resin article of the present invention, specifically in a fiber-reinforced molded article, the volume content of the reinforcement fibers is preferably 40 to 85%, and in terms of strength, further preferably 50 to 70%. Examples of such a molded fiber-reinforced resin article include automotive parts such as a front subframe, a rear subframe, a front pillar, a center pillar, a side member, a cross member, a side sill, a roof rail, and a propeller shaft, a core member of an electric wire, a pipe material for a submarine oil field, roll and pipe materials for a printer, a member for a robotic forklift, and a primary structure material and a secondary structure material for an aircraft.

A method for obtaining the fiber-reinforced molded article from the curable composition of the present invention is not particularly limited. A pultrusion molding method (a pultrusion method), a filament winding method, a RTM method, or the like is preferably used. The pultrusion molding method (pultrusion method) is a method in which the fiber-reinforced composite material is introduced into a mold, heated and cured, and pulled with a pultrusion device, to mold the molded fiber-reinforced resin article. The filament winding method is a method in which the fiber-reinforced composite material (including one-directional fibers) is wound around an alumina liner, a plastic liner, or the like while rotating, and heated and cured, to mold the molded fiber-reinforced resin article. The RTM method is a method in which two types of molds including concave and convex dies are used, and the fiber-reinforced composite material is heated and cured in the molds, to mold the molded fiber-reinforced resin article. When the molded fiber-reinforced resin article that is a large-scale product or has a complicated shape is molded, the RTM method is preferably used.

A molding condition of the molded fiber-reinforced resin article is preferably thermally curing of the fiber-reinforced composite material at a temperature range of 50 to 250° C., and more preferably 70 to 220° C., and molding. When the molding temperature is too low, sufficiently rapid curing properties is not necessarily achieved. In contrast, when it is too high, warping may be caused due to thermal distortion. Examples of another molding condition include a two-stage curing condition in which the fiber-reinforced composite material is pre-cured at 50 to 100° C., to obtain a tack-free cured object, following by treatment under a temperature condition of 120 to 200° C.

Another method for obtaining the fiber-reinforced molded article from the curable composition of the present invention includes a hand layup method and a spraying up method in which a fibrous aggregate is laid on a mold, and the varnish and an fibrous aggregate are multilayered, a vacuum bagging method in which while substrates made of the reinforcement fibers are layered with the substrates being impregnated with a varnish using a convex or concave mold, molded, covered with a flexible mold capable of applying a pressure to a molded object, air-tightly sealed, and molded in vacuum (under reduced pressure), and a SMC pressing method in which a varnish in which the reinforcement fibers are added in advance is molded into a sheet, and compression-molded with a mold.

EXAMPLE

The present invention will be described more specifically by Examples and Comparative Examples, but the present invention is not intended to be limited to Examples and Comparative Examples. Unless otherwise specified, "part (s)" and "%" in the following description are based on mass.

Examples 1 to 9, and Comparative Examples 1 to 7

Components were blended according to compositions listed in Tables 1 and 2 below, and uniformly stirred and mixed, to obtain curable compositions. Cured objects were obtained by using the curable compositions. For the curable compositions and the cured objects, various evaluation tests were carried out in the following manner. Evaluation results are listed in Tables 1 and 2.

The components for the curable compositions used in Examples and Comparative Examples are as follows.

<Epoxy Resin>

830S: "EPICLON 830S" manufactured by DIC Corporation, bisphenol F type epoxy resin, epoxy equivalent: 168 g/eq 840S: "EPICLON 840S" manufactured by DIC Corporation, bisphenol A type epoxy resin, epoxy equivalent: 184 g/eq HP-4032D: "EPICLON HP-4032D" manufactured by DIC Corporation, naphthalene type epoxy resin, epoxy equivalent: 140 g/eq A-1: biphenyl type epoxy resin, epoxy equivalent: 230 g/eq (hereinafter, a production method is described in Epoxy Resin (A-1) that is a biphenyl type epoxy resin)

S-720: "S-720" manufactured by SYNASYA, 4,4'-methylenebis[N,N-diglycidylaniline], epoxy equivalent: 113 g/eq Production of Biphenyl Type Epoxy Resin (A-1)

In a flask equipped with a thermometer, a condenser, a distilling column, a nitrogen gas inlet tube, and a stirrer, 432.4 parts by mass (4.00 mol) of o-cresol, 158.2 parts by mass (1.00 mol) of 2-methoxy naphthalene, and 179.3 parts by mass (2.45 mol) of 41% paraformaldehyde were placed, 9.0 parts by mass of oxalic acid was added, and the temperature was increased to 100° C., to cause a reaction at 100° C. for 3 hours. Subsequently, while water was collected in the distilling column, 73.2 parts by mass (1.00 mol) of 41% paraformaldehyde aqueous solution was added dropwise over 1 hour. After completion of the dropping, the temperature was increased to 150° C. over 1 hour, and a reaction was caused at the same temperature for 2 hours. After completion of the reaction, 1,500 parts by mass of methyl isobutyl ketone was added, and the mixture was transferred to a separation funnel and washed with water. Washing with water was continued until the washing water was neutral. An unreacted raw material and methyl isobutyl ketone were removed under heating and reduced-pressure conditions, to obtain a novolac resin intermediate. The hydroxy group equivalent weight of the obtained novolac resin intermediate was 164 g/eq.

In a flask equipped with a thermometer, a dropping funnel, a condenser, and a stirrer, 113.8 parts by mass (hydroxy group equivalent weight: 0.69 eq) of the obtained novolac resin intermediate, 28.5 parts by mass (hydroxy group equivalent weight: 0.31 eq) of 4,4'-biphenol, 463 parts by mass (5.00 mol) of epichlorohydrin, 139 parts by mass of n-butanol, and 2 parts by mass of tetraethyl benzyl ammonium chloride were then placed and dissolved with nitrogen gas purging. The mixture was heated to 70° C., and the pressure was reduced to a pressure in which azeotropy occurred. 220 parts by mass (1.10 mol) of 20% sodium hydroxide aqueous solution was added dropwise over 5 hours. Subsequently, stirring was continued under the same temperature condition for 0.5 hour. Unreacted epichlorohydrin was distilled under reduced pressure and removed. To the crude product, 1,000 parts by mass of methyl isobutyl ketone and 350 parts by mass of n-butanol were added and dissolved. To this solution, 10 parts by mass of a 10% sodium hydroxide aqueous solution was added, and a reaction was caused at 80° C. for 2 hours. The reaction mixture was washed with water three times, and it was confirmed that the pH of washing water was neutral. Subsequently, the reaction mixture was dehydrated by azeotropy, precious filtration was carried out, and the solvent was distilled off under reduced pressure. Thus, a biphenyl type epoxy resin (A-1) was obtained. The epoxy equivalent of the obtained epoxy resin (A-1) was 230 g/eq (epoxy resin (A-1) in Tables 1 and 2).

<Amine Compound>

TETA: triethylenetetramine 1,3-BAC: 1,3-bis(aminomethyl)cyclohexane

IPDA: isophoronediamine

DETDA: diethyltoluenediamine

<Core-Shell Particles>

MX-154: "KANE ACE MX-154" manufactured by KANEKA CORPORATION, Core-shell type Rubber particles (40%)/bisphenol type epoxy resin (60%), epoxy equivalent: 302 g/eq <Imidazole Compound>1,2-DMZ: 1,2-dimethylimidazole 2E4MZ: 2-ethyl-4-methylimidazole <Measurement of Gel Time>

On a hot plate heated to 120° C., 0.15 g of each of the curable compositions immediately after blending the components at a ratio listed in Table 1 was placed, and a time (second) until a gel was formed was measured while the curable composition was stirred with a spatula. This operation was repeated 3 times, and an average value of the times was evaluated as a gel time. From the viewpoint of rapid curing properties, the gel time is preferably a shorter time (for example, less than 180 seconds).

A: less than 180 seconds

B: 180 seconds or more and less than 360 seconds

C: 360 seconds or more

<Measurement of Glass Transition Temperature>

The curable composition obtained above was poured into a frame with a thickness of 2 mm, and heated at 120° C. for 5 minutes, to obtain a cured object. The cured object obtained was cut with a diamond cutter into a width of 5 mm and a length of 50 mm, to obtain a specimen.

Next, the dynamic viscoelasticity was measured by holding both sides of the specimen and bending the specimen with a viscoelasticity measurement apparatus ("DMS6100" manufactured by SII NanoTechnology Inc.). The temperature at which tan δ is the largest value was evaluated as a glass transition temperature (Tg) (° C.). The dynamic viscoelasticity was measured under, as measurement conditions, a temperature condition of room temperature (25° C.) to glass transition temperature+50° C., a temperature increasing rate of 3° C./min, a frequency of 1 Hz, and amplitude of 25 □m. The glass transition temperature is preferably higher than 120° C., which is a temperature of curing the curable composition, and more preferably higher temperature from the viewpoint of heat resistance.

<Measurement of Fracture Toughness>

The curable composition obtained above was poured into a frame with a thickness of 6 mm, and heated at 120° C. for 5 minutes, to obtain a cured object. The cured object obtained was cut with a diamond cutter into a width of 12 mm and a length of 55 mm, to form a specimen in accordance with ASTM D-5045.

Subsequently, the specimen was subjected to a fracture toughness test in accordance with ASTM D-5045. Specifically, a three-point bending test was carried out under conditions of a span of 48 mm and a head speed of 10 mm/min, a load-displacement curve was confirmed to be linear, a fracture toughness value $K_{IC}$ (MPa·m$^{1/2}$) was measured, and fracture toughness was evaluated. From the viewpoint of toughness, the fracture toughness value is preferably higher.

<Measurement of Viscosity>

The viscosity at 25° C. in a state where the components other than the amine compound and imidazole were blended (a mixture of epoxy resin and core-shell particles) was measured with an E-type viscometer "TV-20" (manufactured by TOKI SANGYO CO., LTD.).

TABLE 1

| Composition: blending amount (g) | | | Example 1 | Example 2 | Example 3 | Example 4 | Example 5 | Example 6 | Example 7 | Example 8 | Example 9 |
|---|---|---|---|---|---|---|---|---|---|---|---|
| A | Epoxy resin | 830-S | 85 | 85 | 85 | 85 | 65 | 50 | 75 | 75 | 85 |
| | | 840-S | | | | | 20 | 35 | | | |
| | | HP-4032D | | | | | | | 10 | | |
| | | A-1 | | | | | | | | 10 | |
| | | S-720 | | | | | | | | | |
| B | Amine compound | TETA | | | 10.8 | | | | | | |
| | | 1,3-BAC | 15.8 | 9.9 | | | 13.5 | 13.3 | 14.1 | 13.4 | 15.8 |
| | | IPDA | | | | 18.9 | | | | | |
| | | DETDA | | | | | | | | | |
| C | Core-shell particles | MX-154 | 15 | 15 | 15 | 15 | 15 | 15 | 15 | 15 | 15 |
| D | Imidazole compound | 1,2-DMZ | 0.6 | 1.1 | 0.6 | 1.0 | 0.6 | 0.6 | 0.6 | 0.6 | |
| | | 2E4MZ | | | | | | | | | 0.6 |
| Amount by mole of epoxy group E | | mol | 0.556 | 0.556 | 0.556 | 0.556 | 0.545 | 0.538 | 0.568 | 0.540 | 0.556 |
| Amount by mole of active hydrogen H | | mol | 0.445 | 0.279 | 0.443 | 0.445 | 0.380 | 0.375 | 0.397 | 0.378 | 0.445 |
| Active hydrogen/epoxy group (H/E) | | | 0.8 | 0.5 | 0.8 | 0.8 | 0.7 | 0.7 | 0.7 | 0.7 | 0.8 |
| Viscosity | | mPa · s | 4,900 | 4,900 | 4,900 | 4,900 | 5,800 | 6,700 | 5,700 | 10,000 | 4,900 |
| Gel time (Gt) | | s | A | A | A | A | A | A | A | A | A |
| Glass transition temperature (Tg) | | ° C. | 135 | 146 | 134 | 139 | 143 | 149 | 144 | 140 | 135 |
| Fracture toughness value ($K_{1c}$) | | MPa m$^{1/2}$ | 2.4 | 2.0 | 2.3 | 1.9 | 2.3 | 2.2 | 2.6 | 2.8 | 2.3 |

TABLE 2

| Composition: blending amount (g) | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| A | Epoxy resin | 830-S | 100 | 85 | 85 | 75 | 85 | 85 | 85 |
| | | 840-S | | | | | | | |
| | | HP-4032D | | | | | | | |
| | | A-1 | | | | | | | |
| | | S-720 | | | | 10 | | | |
| B | Amine compound | TETA | | | | | 13.5 | | |
| | | 1,3-BAC | 21.1 | 19.7 | 3.9 | 20.7 | | | |
| | | IPDA | | | | | | 23.6 | |
| | | DETDA | | | | | | | 25 |
| C | Core-shell particles | MX-154 | | 15 | 15 | 15 | 15 | 15 | 15 |
| D | Imidazole compound | 1,2-DMZ | | | 2.1 | | | | |
| | | 2E4MZ | | | | | | | |
| Amount by mole of epoxy group E | | mol | 0.595 | 0.556 | 0.556 | 0.585 | 0.556 | 0.556 | 0.556 |
| Amount by mole of active hydrogen H | | mol | 0.594 | 0.555 | 0.110 | 0.583 | 0.553 | 0.555 | (0.556) |
| Active hydrogen/epoxy group (H/E) | | | 1.0 | 1.0 | 0.2 | 1.0 | 1.0 | 1.0 | (1.0) |
| Viscosity | | mPa · s | 3,300 | 4,900 | 4,900 | 6,600 | 4,900 | 4,900 | 4,900 |
| Gel time (Gt) | | s | A | A | A | A | A | B | C |
| Glass transition temperature (Tg) | | ° C. | 129 | 128 | 156 | 138 | 108 | 124 | Uncured |
| Fracture toughness value ($K_{1c}$) | | MPa $m^{1/2}$ | 0.7 | 1.9 | 1.3 | 1.6 | 2.0 | 1.6 | |

Notes: In Comparative Example 7, the "amount by mole of active hydrogen H" and the "ratio of active hydrogen/epoxy group (H/E)" in Table 2 are not values based on "aliphatic amine compound and/or alicyclic amine compound (B)" unlike Examples and other Comparative Examples. This is because the aliphatic amine compound and/or the alicyclic amine compound (B) is not used.

From the evaluation results in Table 1, in all Examples, a short gel time and rapid curing properties were confirmed since the ratio H/E of the amount by mole H of active hydrogen in the aliphatic amine compound and/or the alicyclic amine compound (B) to the amount by mole E of epoxy group in the epoxy resin (A) was 0.3 to 0.9 and the imidazole (D) was contained. Furthermore, high glass transition temperatures of the obtained cured objects, high heat resistance, high fracture toughness values, and high toughness were confirmed. In particular, both high heat resistance and high toughness were achieved, an excellent effect was expressed, and their usefulness was confirmed.

On the other hand, in Comparative Examples, a curable composition formed from a desired raw material was not used, or the ratio H/E was out of a desired range. Therefore, rapid curing properties were not achieved, a low glass transition temperature, lower heat resistance, low fracture toughness, and lower toughness were confirmed as compared with Examples. In particular, in Comparative Example 7, an aliphatic amine compound and/or an alicyclic amine compound was not used, and the ratio H/E was out of the desired range. Therefore, the gel time was long, and a cured object was not obtained.

The invention claimed is:

1. A curable composition comprising an epoxy resin (A), an aliphatic amine compound and/or an alicyclic amine compound (B), core-shell particles (C), and an imidazole compound (D), wherein a ratio H/E of an amount by mole H of active hydrogen in the aliphatic amine compound and/or the alicyclic amine compound (B) to an amount by mole E of epoxy group in the epoxy resin (A) is 0.3 to 0.9.

2. The curable composition according to claim 1, wherein the epoxy resin (A) contains a bisphenol F type epoxy resin.

3. The curable composition according to claim 1, wherein a mixture of the epoxy resin (A) and the core-shell particles (C) has a viscosity at 25° C. of 1,000 to 100,000 mPa·s.

4. The curable composition according to claim 1, wherein the aliphatic amine compound and/or the alicyclic amine compound (B) is at least one selected from the group consisting of triethylenetetramine, 1,3-bis (aminomethyl) cyclohexane, and isophoronediamine.

5. The curable composition according to claim 1, wherein the core-shell particles (C) are contained in an amount of 1 to 10 parts by mass relative to 100 parts by mass of a total amount of the curable composition.

6. The curable composition according to claim 1, wherein the core-shell particles (C) have a volume average particle diameter of 50 to 1,000 nm.

7. The curable composition according to claim 1, wherein the imidazole compound (D) is contained in an amount of 0.2 to 4 parts by mass relative to 100 parts by mass of the epoxy resin (A).

8. The curable composition according to claim 1, wherein the imidazole compound (D) is at least one selected from the group consisting of imidazole, 1-methylimidazole, 2-methylimidazole, 1,2-dimethylimidazole, and 2-ethyl-4-methylimidazole.

9. The curable composition according to claim 1, wherein the epoxy resin (A) contains a naphthalene type epoxy resin and/or a biphenyl type epoxy resin.

10. A cured object of the curable composition according to claim 1.

11. A fiber-reinforced composite material comprising the curable composition according to claim 1, and reinforcement fibers.

12. A molded fiber-reinforced resin article comprising the cured object according to claim 10, and reinforcement fibers.

13. The curable composition according to claim 2, wherein a mixture of the epoxy resin (A) and the core-shell particles (C) has a viscosity at 25° C. of 1,000 to 100,000 mPa·s.

14. The curable composition according to claim 2, wherein the aliphatic amine compound and/or the alicyclic amine compound (B) is at least one selected from the group consisting of triethylenetetramine, 1,3-bis (aminomethyl) cyclohexane, and isophoronediamine.

15. The curable composition according to claim 2, wherein the core-shell particles (C) are contained in an amount of 1 to 10 parts by mass relative to 100 parts by mass of a total amount of the curable composition.

16. The curable composition according to claim 2, wherein the core-shell particles (C) have a volume average particle diameter of 50 to 1,000 nm.

17. The curable composition according to claim 2, wherein the imidazole compound (D) is contained in an amount of 0.2 to 4 parts by mass relative to 100 parts by mass of the epoxy resin (A).

18. The curable composition according to claim 2, wherein the imidazole compound (D) is at least one selected from the group consisting of imidazole, 1-methylimidazole, 2-methylimidazole, 1,2-dimethylimidazole, and 2-ethyl-4-methylimidazole.

19. The curable composition according to claim 2, wherein the epoxy resin (A) contains a naphthalene type epoxy resin and/or a biphenyl type epoxy resin.

20. A cured object of the curable composition according to claim 2.

* * * * *